Jan. 5, 1943.  R. S. BOHANNAN  2,307,196
HYDRAULIC FORCE TRANSMISSION MECHANISM
Filed June 26, 1941.  2 Sheets-Sheet 1
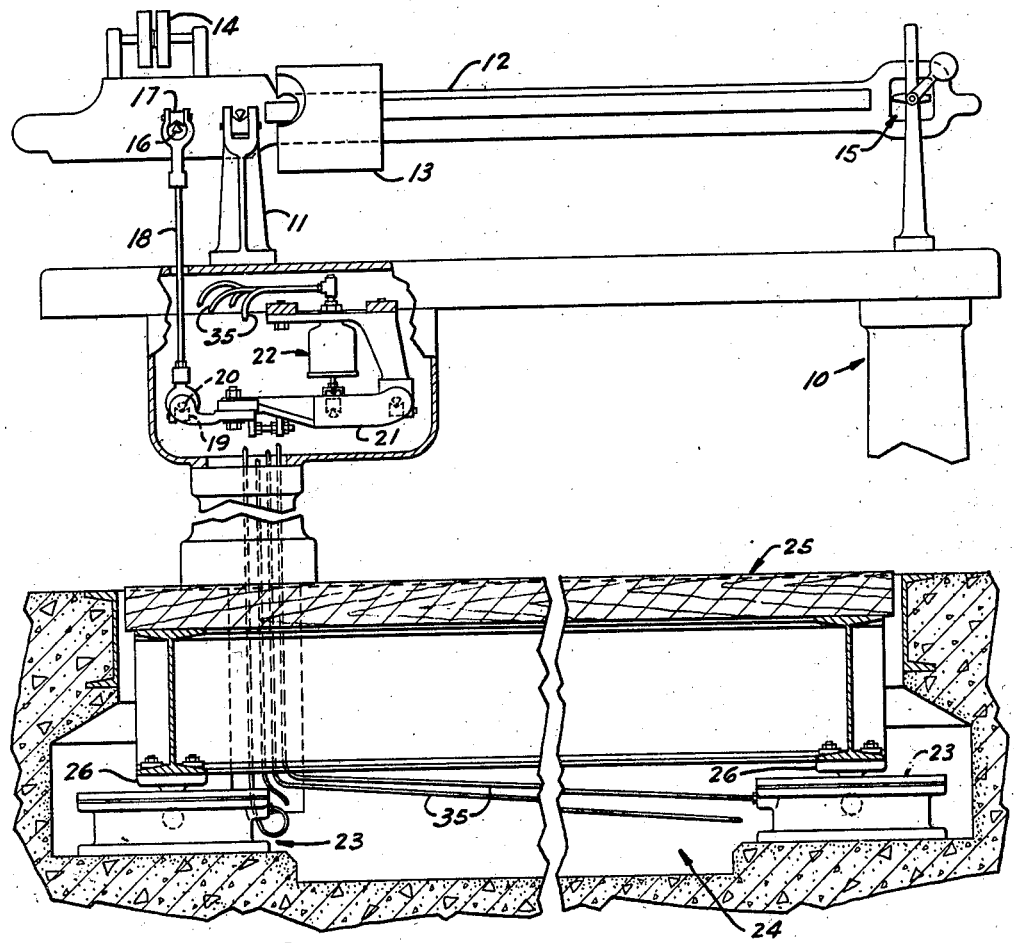
Fig. I
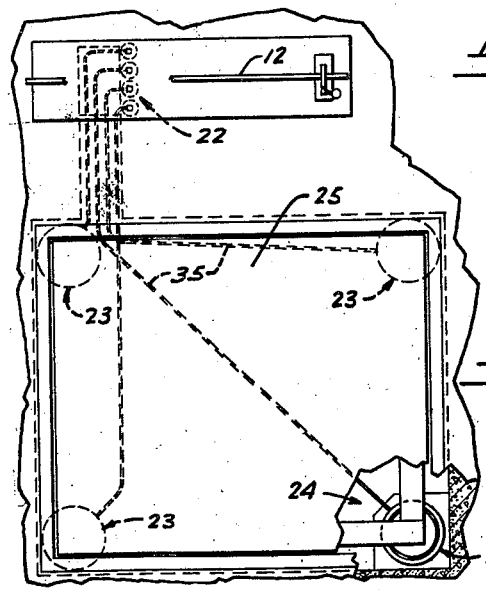
Fig. II
Robert S. Bohannan
INVENTOR
BY Marshall and Marshall
ATTORNEYS

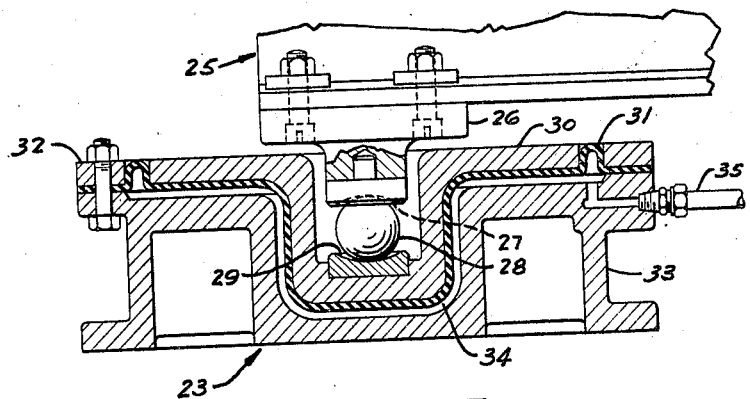
Fig. III
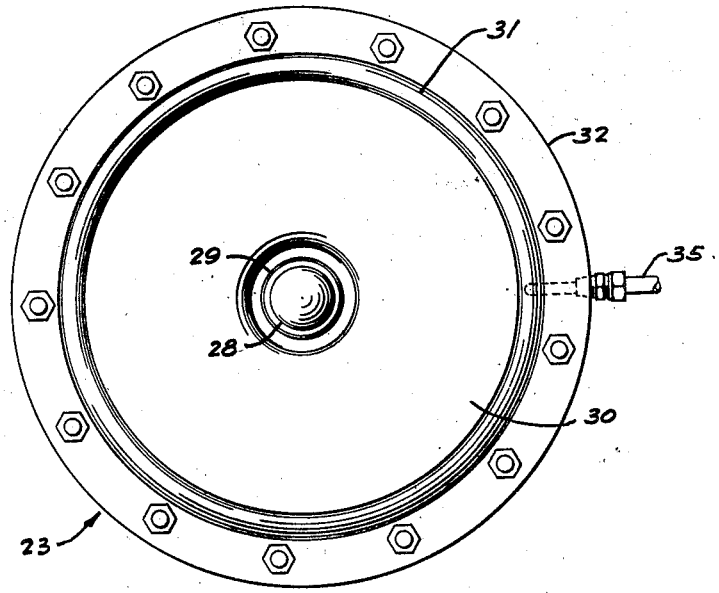
Fig. IV
Robert S. Bohannan
INVENTOR
BY Marshall and Marshall
ATTORNEYS Patented Jan. 5, 1943

2,307,196

UNITED STATES PATENT OFFICE 2,307,196

HYDRAULIC FORCE TRANSMISSION MECHANISM

Robert S. Bohannan, Toledo, Ohio, assignor to Toledo Scale Company, Toledo, Ohio, a corporation of New Jersey Application June 26, 1941, Serial No. 399,794

5 Claims. (Cl. 265—47)

This invention relates to weighing scales of the type wherein the force transmission mechanism includes a hydraulic system, and more particularly to the capsules supporting the load receiver and forming one element of the hydraulic system.

In a hydraulic scale, the capsules, on which is supported the load receiver of the scale, transmit the pressure created by the load on the scale to the pressure responsive elements of the scale. It is necessary that the pressure, in terms of pounds per square inch, which is transmitted by the capsules under a certain load, shall be the same each time that the same load is placed upon the scale. Pressure is applied to liquid in each capsule by a pressure plate, usually in the shape of a short flat cylinder which is connected to the body of the capsule by means of a flexible diaphragm. The pressure in terms of pounds per square inch would vary if the pressure plate were of a variable area. Since the effective area of the pressure plate of the capsule is a function of the longest horizontal line within the plate, it can be seen that if the cylindrical plate were tilted slightly the horizontal line would become longer as the plate tilted and consequently would transmit a lower pressure per square inch to the pressure responsive elements of the scale which would cause the scale to indicate a lesser load than that actually placed upon the platform. Slight tilting of the pressure plate may be caused in any of several ways. One of these is the shifting of the load contact point on the pressure plate which is caused by the deflection of the platform itself. This deflection can result from the placing of a load on the center of the platform, thus bending the platform and causing its ends to be pulled inwardly towards the center. The pressure point of the platform on the plate thereby would be shifted toward the center of the scale and would tilt the plate which would result, as outlined above, in an error in the scale reading. Tilting of the capsule plates from other causes would have similar effects on the accuracy of the scale.

It is an object of this invention to provide a capsule and pressure plate wherein the results of any shifting of the pressure point on the capsule plate will be minimized.

Another object is to provide a capsule and pressure plate so designed that lateral shifting of the point at which the load is applied to the pressure plate will cause less tilting of the plate.

More specific objects and advantages are apparent from the description, in which reference is had to the accompanying drawings illustrating a preferred form of scale embodying the invention.

In the drawings:

Fig. I is a view in front elevation of a scale embodying the invention, certain parts being in section and certain parts being broken away.

Fig. II is a reduced plan view of the scale illustrated in Fig. I.

Fig. III is a vertical sectional view of a capsule embodying the invention.

Fig. IV is a plan view of the capsule shown in Fig. III.

The specific drawings and the specific description that follows merely disclose and illustrate the invention and are not intended to impose limitations upon the claims.

Mechanism illustrated generally in the accompanying drawings, but which does not constitute part of the instant invention, is fully described in my copending applications Serial Nos. 222,831 and 299,832, and such mechanism, therefore, is described herein only in such detail as will suffice to enable the connection of the instant invention therewith to be clearly understood.

Mounted upon a column and shelf structure 10, being fulcrumed on a bearing held in the fulcrum stand 11, is a beam 12 having a poise 13, balance weights 14 and trig and locking loop 15. Resting on a load pivot 16 of the beam 12 is a bearing 17 held in the upper end of a vertical pull rod 18. The vertical pull rod 18 has, attached to its lower end, a clevis-held bearing 19 in which rests a nose pivot 20 of a shelf lever 21 fulcrumed on a bracket carried by the structure 10. Mounted in a bracket on the structure 10 are pressure responsive chambers 22 which are each connected to a capsule 23 located in a pit 24. Within each of the pressure responsive chambers 22 is a metallic bellows (not shown) which applies force on the shelf lever 21 through a strut and bearing acting upon the load pivot of the shelf lever 21. A platform 25 is supported on the capsules 23.

The frame of the platform 25 has, mounted on the underside of each of its corners, a leg 26, in the lower end of which there is a concave depression 27 which rides on a ball 28 carried in a concave depression 29 in the upper surface of a pressure plate 30. The pressure plate 30 is constructed with a deep cup in its center, the main body of the plate lying along a horizontal plane at right angles to the axis of the cupped portion of the plate. The concave depression 29 is located in the bottom of the cupped portion of the plate 30.

A flexible diaphragm 31 is molded to conform to the peripheral contour of the plate 30 and is clamped, by means of an annular clamping ring 32, to a capsule body 33 which also has a centrally located cup-shaped depression 34. The flexible diaphragm 31 is adapted to confine a quantity of liquid in the space between its lower surface and the upper surface of the capsule body 33. This space is connected to one of the pressure chambers 22 by means of a pipe 35.

Since the point of application of the load which is placed upon the platform 25 is at the point of contact between the ball 28 and the concave depression 29, this point of application of the load is substantially below the main body of the liquid confined within the capsule and below the horizontal plane along which the flexible diaphragm 31 is supported. This lowering of the pressure application point, possible because of the cup-shaped pressure plate 30, the diaphragm 31 and the capsule body 33, in effect "underslings" the capsule and stabilizes the pressure plate, and any tilting of the plate, because of deflection of the platform, or other reasons, is greatly decreased.

Also, since the tilting of the plate, due to the shift of the pressure application, would be nil at infinity below the plane of suspension of the diaphragm, the location of the pressure point as far below this plane of suspension as is practicably possible reduces the shifting to a negligible amount.

The embodiment of the invention that has been disclosed may be modified to meet various requirements.

Having described the invention, I claim:

1. In a weighing scale, in combination, a plurality of capsules adapted to contain a liquid, each of said capsules having a diaphragm therein adapted to confine such liquid therein, and a pressure plate resting on said diaphragm, and a load receiver mounted on said pressure plates at points thereon below the horizontal plane of support of said diaphragms.

2. In a weighing scale, in combination, a plurality of capsules adapted to contain a liquid, a diaphragm in each of said capsules confining such liquid in said capsule, and a pressure plate in each of said capsules resting on said diaphragm and having a centrally located depressed portion below the plane of support of said diaphragm, and a load receiver supported on said depressed portion of said pressure plates.

3. In a weighing scale, in combination, a plurality of capsules adapted to contain a liquid, each of said capsules having a diaphragm therein adapted to confine such liquid in said capsule and a pressure plate resting on said diaphragm, said pressure plate having a centrally located depressed portion below the plane of support of said diaphragm, said diaphragm having a conforming shape, and a load receiver supported on said depressed portion of said pressure plates.

4. In a weighing scale, in combination, a load rceiver, a plurality of capsules, a pressure plate in each of said capsules, a diaphragm supporting each of said pressure plates and adapted to confine a quantity of liquid in said capsule, each of said pressure plates having a centrally located depressed portion therein, said depressed portion being substantially below the plane of support of said diaphragm, said load receiver being supported by said pressure plates the point of contact being in said depressed portion, said diaphragm having a shape conforming to that of said pressure plate, and a lower capsule body supporting each of said diaphragms.

5. In a weighing scale, in combination, a plurality of capsules, each of said capsules comprising a capsule body having a centrally located recess therein, a diaphragm substantially conforming in shape to said capsule body, adapted to confine a quantity of liquid in said capsule and supported by said capsule body on a horizontal plane above said recess and a pressure plate supported by said diaphragm, said pressure plate also having a centrally located recess nesting in said diaphragm, and a load receiver mounted on said upper capsule plates in said centrally located recesses, the points of contact being substantially below the plane of support of said diaphragms.

ROBERT S. BOHANNAN.